Figure 1:
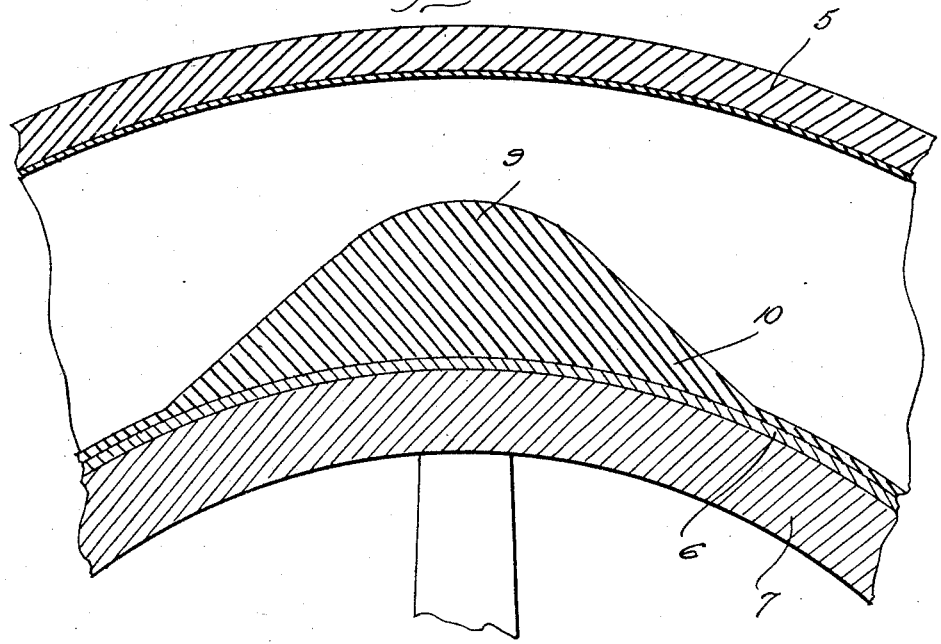

Nov. 6, 1928.

F. J. AUSTIN

LOW AIR PRESSURE DETECTOR AND SIGNAL INNER TUBE

Filed Sept. 15, 1927

Inventor
Forrest J. Austin

By Clarence A. O'Brien
Attorney

Patented Nov. 6, 1928.

1,690,613

UNITED STATES PATENT OFFICE.

FORREST J. AUSTIN, OF HIAWATHA, KANSAS.

LOW-AIR-PRESSURE DETECTOR AND SIGNAL INNER TUBE.

Application filed September 15, 1927. Serial No. 219,751.

In carrying out the present invention, it is my purpose to provide a means incorporated as part of the inner tube for effectively indicating to the operator of the motor vehicle upon which the tire having the tube therein when the tube has become totally or partially deflated and thereby hindering the running of the vehicle while said tire tube is partly or totally deflated.

The primary object of the invention resides in the provision of an alarm incorporated in the inner tube so as to eliminate all danger of rubbing, and unnecessary friction when the tire is underinflated.

A still further important object of the invention resides in the provision of an inner tube of this nature having the signaling means incorporated therein so that the combined structure is exceedingly simple and may be manufactured and marketed at a comparatively low cost.

Briefly described, this improved inner tube comprises an inner tube of ordinary construction having projecting from the rim portion thereof a flexible resilient rubber or other like material block which will effect the bumping of the machine whenever the tire becomes totally or partially deflated and thus give an alarm to the driver.

Numerous advantages of an alarm of this nature will be apparent as the nature of the invention is better understood, the same comprising the novel form and construction set forth in the following detailed specification, shown in the accompanying drawing and claimed.

In the drawing:—

Figure 2:
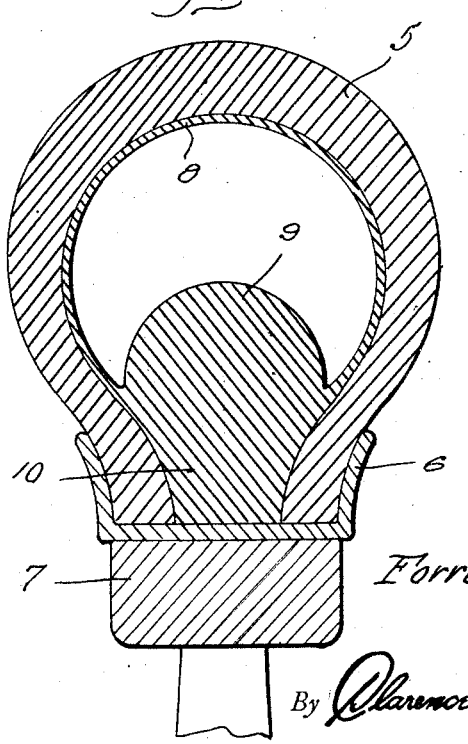

Figure 1 is a fragmentary longitudinal section through a pneumatic tire equipped with my improved alarm tube, and, Figure 2 is a transverse section therethrough.

Referring to the drawings in detail it will be seen that in one of the most practical embodiments of my invention the numeral 5 denotes an ordinary casing of a pneumatic tire for positioning upon the rim 6 of a vehicle wheel 7 and the numeral 8 denotes my improved inner tube having the usual construction throughout the major portion of its length.

My improvement per se embodies the provision of a resilient flexible hump 9 formed interiorly of the tube to project from the inner portion thereof toward the tread portion thereof and said hump being formed on a block 10 which is shaped to fit snugly between the bead portions of the tire shoe 5 and rest on the rim 6.

I appreciate that I am not the first in this art to provide an alarm for indicating the deflation of the tire by causing bumping of the wheel on which the tire is disposed. However, all the devices heretofore patented have certain defects which cause unnecessary injury to the tube and shoe when the bumping is taking place. My device is the only one which provides the bump integrally with the tube within the lumen thereof. Whenever the hump is disposed between the casing and the inner tube as is the practice heretofore, it has been found that the hump causes excessive friction and consequent heating and therefore pinches the tube and the result usually is the ruination of the tube and often causes rim cuts.

My improved structure has nothing to do with the outer casing or shoe and is an addition to be incorporated within the tube at the time of manufacture. As the position of this detector hump may be changed in its relation to the tire to a certain extent each time the tube is removed from the tire for repair or otherwise, the extra wear on the tire due to the bumping while running underinflated, would be distributed around the tire and the tire would not be damaged repeatedly at one spot.

From the above, numerous advantages of a device of this character will be at once appreciated by the owners of motor vehicles employing pneumatic tires, and even though I have herein set forth the most practical embodiment of the invention with which I am at the present time familiar, it is nevertheless to be understood that minor changes may be made therein without departing from the spirit or scope of the invention as hereinafter claimed.

Having thus described my invention, what I claim as new is:—

An inner tube for pneumatic tires comprising a hollow tubular continuous body, a flexible resilient hump formed integrally on the inner portion of the tube and projecting inwardly thereof toward the tread, said hump being semi-cylindrical in cross section and from its center tapering toward its end to gradually merge into the thickness of the tube wall, said hump being formed with a block extension projecting outwardly of the lumen toward the center of the tube, said block having curved sides to conform to the curvature of the beads of the pneumatic tire shoe in which the tube is to be used.

In testimony whereof I affix my signature.

FORREST J. AUSTIN.